(12) United States Patent
Law et al.

(10) Patent No.: US 9,268,666 B2
(45) Date of Patent: *Feb. 23, 2016

(54) SYSTEM AND METHOD FOR DEBUGGING OF COMPUTER PROGRAMS

(75) Inventors: Gregory Edward Warwick Law, Cambridge (GB); Julian Philip Smith, Oxford (GB)

(73) Assignee: UNDO LTD. (GB)

( * ) Notice: Subject to any disclaimer, the term of this patent is extended or adjusted under 35 U.S.C. 154(b) by 1105 days.

This patent is subject to a terminal disclaimer.

(21) Appl. No.: 13/309,205

(22) Filed: Dec. 1, 2011

(65) Prior Publication Data

US 2012/0096441 A1    Apr. 19, 2012

Related U.S. Application Data

(63) Continuation-in-part of application No. 12/090,974, filed on Apr. 21, 2008, now Pat. No. 8,090,989.

(30) Foreign Application Priority Data

Oct. 21, 2005  (GB) .................................. 0521465.5
Oct. 11, 2006  (WO) ................. PCT/GB2006/050324

(51) Int. Cl.
*G06F 11/36*          (2006.01)

(52) U.S. Cl.
CPC ........ *G06F 11/3644* (2013.01); *G06F 11/3668* (2013.01); *G06F 11/362* (2013.01)

(58) Field of Classification Search
CPC   G06F 11/3664; G06F 11/362; G06F 11/3668

USPC .......................................... 717/124; 712/227
See application file for complete search history.

(56) References Cited

U.S. PATENT DOCUMENTS

| | | | |
|---|---|---|---|
| 5,428,618 A | 6/1995 | Ueki et al. | |
| 5,784,552 A | 7/1998 | Bishop et al. | |
| 5,870,607 A | 2/1999 | Netzer | |
| 6,101,524 A | 8/2000 | Choi et al. | |
| 6,901,581 B1 | 5/2005 | Schneider | |
| 7,506,318 B1 | 3/2009 | Lindo et al. | |
| 7,620,850 B2 * | 11/2009 | Lev et al. ........................ | 714/35 |
| 7,673,181 B1 * | 3/2010 | Lindo et al. ................ | 714/38.13 |

(Continued)

FOREIGN PATENT DOCUMENTS

WO    WO 2007/045920 A2    4/2007

OTHER PUBLICATIONS

"Yang et al" ;"Runtime Model Checking of Multithreaded C/C++ Programs";"Mar. 20, 2007";"11pages".*

(Continued)

*Primary Examiner* — Wei Zhen
*Assistant Examiner* — Brahim Bourzik
(74) *Attorney, Agent, or Firm* — Tarolli, Sundheim, Covell & Tummino LLP

(57) ABSTRACT

We describe techniques which relate to bi-directional, in particular backwards, debugging of computer programs. Thus we describe identifying processes with shared memory access, such as threads or multicore processes, by arranging process (thread) memory ownership to deliberate provoke memory page faults to identify and handle concurrent memory access by multiple threads in such a manner as to enable deterministic replay, and hence backwards debugging.

7 Claims, 6 Drawing Sheets

(56) References Cited

U.S. PATENT DOCUMENTS

| | | | |
|---|---|---|---|
| 8,490,181 B2* | 7/2013 | Bergheaud et al. | 726/21 |
| 2004/0216092 A1 | 10/2004 | Ayers et al. | |
| 2004/0268310 A1 | 12/2004 | Morgan | |
| 2009/0254724 A1* | 10/2009 | Vertes et al. | 711/162 |
| 2010/0251031 A1 | 9/2010 | Nieh et al. | |
| 2011/0264867 A1* | 10/2011 | Wan et al. | 711/147 |

OTHER PUBLICATIONS

"Bergheaud et al";"Fault Tolerance in Multiprocessor Systems Via Application Cloning";"2007";"10 pages".*
"Satish et al";"BugNet: Continuously Recording Program Execution for Deterministic Replay Debugging Satish";"Jun. 2005";"12 Pages".*
"Gautam et al";"ODR: Output-Deterministic Replay for Multicore Debugging";"Oct. 2009";"14 pages".*
"Ronsse et al";"Debugging shared memory parallel programs using record/replay";"2003";"9 pages".*
European Search Report from related EP 12 19 3650 completed Feb. 15, 2013.
Leblanc, et al.: *"Debugging Parallel Programs with Instant Replay"*; IEEE Transactions on Computers, IEEE Service Center, Los Alamitos, CA, US, vol. C-34, No. 4, Apr. 1, 1987, pp. 471-482, XP011291295, ISSN: 0018-9340 (Abstract, Figs. 1 & 2, p. 474, left-hand column, ¶1, p. 476, left-hand column, ¶2).
Pan, D. Z., et al.: *"Supporting Reverse Execution of Parallel Programs"*; ACM Sigplan Notices, ACM, Association for Computing Machinery, New York, NY, US, vol. 24, No. 1, Jan. 1, 1989, pp. 124-129, XP002435056, ISSN: 0362-1340, DOI: 10.1145/69215.69227, ISBN: 978-1-58113-450-6 (entire document).
Cornelis: *"A Taxonomy of Execution Replay Systems"*; International Conference on Advances in Infrastructure Foreletronic Business, Education, Science, Medicine and Mobiletechnologies on the Internet, Jan. 1, 2003, XP002435057 (entire document).
Boothe: *"Efficient Algorithms for Bidirectional Debugging"*; ACM Sigplan Conference on Programming Language Design and Implementation, 2000, XP002692247 (entire document).
International Search Report for corresponding PCT/GB2006/050324; completed Jun. 1, 2007 by Yaniv Sabbah (attached).
Pan D Z et al: "Supporting Reverse Execution of Parallel Programs"; SIGPLAN Notices USA, vol. 24, No. 1, Jan. 1989, pp. 124-129, XP002435056 ISSN: 0362-1340 (entire document).
Georges A et al: "Jarec: A Portable Record/Replay Environment for Multi-Threaded Java Applications"; Software Practice & Experience, Wiley & Sons, Bognor Regis, GB, vol. 34, No. 6, May 2004, pp. 523-547, XP001192644, ISSN: 0038-0644 (entire document).
Stuart I Feldman and Channing B Brown: "Igor: A System for Program Debugging via Reversible Execution"; Proceedings of the ACM SIGPLAN and SIGOPS Workshop on Parallel and Distributed Debugging, XX,XX, 1988 pp. 112-123, XP0022166957, p. 115, line 1-p. 119, line 40 (Abstract).
Cornelis: "A Taxonomy of Execution Replay Systems" International Conference on Advances in Infrastructure for Electronic Business, Education, Science, Medicine, and Mobile Technologies on the Internet, 2003, p. CDROM Paper 59, XP002435057 (entire document).
Steven Allen Lewis: "Technique for Efficiently Recording State Changes of a Computer Environment to Support Reversible Debugging"; Thesis, Graduate School of Florida, 2001, p. 1-78, XP002435058 (pp. 23, line1-16, p. 3, line 11-last line, p. 9, line 14-p. 10, line 2).
Bil Lewis: *"Debugging Backwards in Time"*, Oct. 9, 2003, Fifth Int. Workshop on Automated and Algorithmic Debugging.

\* cited by examiner

```
.section .data
buf:

.section .text
.globl main
main:

mov   $buf, %ecx   #ecx points at buf
.start:

mov   $3, %eax     #do syscall #3 (read)
  mov   $0, %ebx     #from fd 0 (stdin)
  mov   $1, %edx     #read a single char
  int   $0x80        #make the system call mov   $4, %eax     #do syscall #4 (write)
  mov   $1, %ebx     #to fd 1 (stdout)
                     #ecx still at buff
                     #edx still contains 1
  int   $0x80        #make the system call cmpb  $10, buff    #did user hit enter?
  jne   .start       #if not, round again
  ret
```

Figure 2

SYSTEM AND METHOD FOR DEBUGGING OF COMPUTER PROGRAMS

RELATED APPLICATIONS

This application is a continuation-in-part of U.S. patent application Ser. No. 12/090,974, filed 12 Apr. 2008, the subject matter of which is incorporated herein by reference.

FIELD OF THE INVENTION

The present invention relates to debugging of computer programs, and in particular to bi-directional debugging. Embodiments of the invention are especially advantageous for handling non-deterministic events such as thread-switches, reading from shared memory, and receipt of asynchronous events.

BACKGROUND TO THE INVENTION

When writing computer programs it is sometimes the case that errors, or 'bugs', are included in a program. Sometimes this is due to typographical errors in writing the source code (e.g. omitting a character or substituting one character for another), sometimes due to implementing incorrect functionality (e.g. causing a loop to terminate at one when it ought to terminate at zero) and sometimes due to errors in other programs upon which the author is relying, for example a library routine or even the compiler itself.

A debugger can help someone attempting to find and remove bugs from a program. Prior art debuggers have tended to focus upon inserting so-called breakpoints into a program and running a program forwards in time, stopping at one or more of the breakpoints in order to examine the state of the program (content of processor registers, content of memory) at that breakpoint in the hope of catching an error before it causes the program to crash. Crashing can take many forms, generally summarised as the program not running as intended, for example a segmentation fault, an unhandled exception or an infinite loop (where a program stops responding to user input and executes the same routines indefinitely). An example of such a prior art debugger is GDB, the GNU Project Debugger.

However, the cause of an error in a program may occur long before the error manifests itself. This makes such forward debugging difficult, as it may not be obvious which particular change in program state caused an error, especially if it occurred a long time previous to the error actually showing up, with many correct program operations in the intermediate period. Furthermore, some errors are more easy to spot than others, as in general a computer simply does what it is programmed to do, and the cause of the error may lie in the user's understanding of how it works, as distinct from how it actually works. On the other hand, a user may have a correct understanding of how his program is intended to work, but if there are errors in a library routine upon which he is relying (for example a mathematical square root function), then the program may give the wrong result even though the parts of the program written by the user are functioning as the user intended. In this case there are two options for correcting the error; the first is to correct the error in the library routine (which may not always be possible as a user may not always have access to the source code of library routines) and the second is to provide a 'workaround' in the user's program to ensure that the error in the library routine does not cause his own program to give the wrong results.

For these reasons and others it would be useful to be able to step backwards in the execution of a computer program so as to be able to trace an error from the moment it caused the program to crash back until the error first appeared. This is impossible with conventional prior art debuggers as these only allow forward execution of programs. Backwards execution is actually a hard problem to solve, as in the process of executing a program there may be intermediate results which are lost as the program executes, making it difficult to return to a previous state unless a record is kept of these results. Furthermore, due to the operation of jump instructions in a program, it can impossible to tell, without keeping a record of program execution, where execution was taking place in a program prior to the current position. It could have been executing the instruction before the current one, or it could have just executed a jump instruction somewhere else which caused execution to jump to the current position. In addition, with variable length instruction sets such as Intel IA32 it may not be possible to trace execution backwards at all without keeping some kind of record, since there may be no way of knowing whether the previous instruction was a one byte instruction just before the current position, or a two byte instruction two places before the current position, and so on.

Several attempts have been made to solve the problem of backwards debugging, but a solution to the problem of non-determinism in programs has remained elusive. One approach to the problem of backwards debugging is described in the paper "Efficient Algorithms for Bidirectional Debugging" (Boothe, 2000 ACM SIGPLAN Conference on Programming Language Design and Implementation, Vancouver, British Columbia). This describes a source code C and C++ debugger running on Digital/Compaq Alpha based UNIX workstations. This debugger describes embedding event counters into the program being debugged and using these counters to identify a target event on the fly as the target program executes.

However there are a number of problems with this approach. Firstly, it fails to properly address the problem of non-determinism. Secondly, as it operates on the source code of a program not the object code, if a problem occurs with a program for which the source code is not available, it will not be possible to debug the program using this method. Thirdly the bug that is being hunted is likely to cause the backwards debugger itself to malfunction. Fourthly the approach cannot be used on bugs which cause the program to function outside the normal control flow implied by the source language (for example, returning from a function after the stack has been corrupted). Fifth, if a problem occurs due to the functioning of the compiler itself, it may not be possible to detect the problem as the program is not compiled in its 'normal' form at all—instead a modified version of the program including debug routines is compiled, in which the problem with the compiler may not manifest itself, or may manifest itself in a completely different way. Sixth, different debugger programs would have to be written for debugging source code written in different programming languages, and it does not provide a solution at all for the problem of debugging programs written in machine code.

It would be advantageous to provide a debugger capable of backwards debugging which addresses the above-cited problems.

SUMMARY OF THE INVENTION

In an embodiment of the invention there is provided a method of returning to a state in the history of execution of a computer program, said state comprising a set of values of one or more of registers of a processor on which the program is running, working memory space to which the program has access and operating system resources allocated to the program, the method comprising identifying in machine code representing said program, instances of machine code instructions associated with substantially non-deterministic events, modifying said program machine code to execute a program instrumentation set of machine code instructions to handle said substantially non-deterministic events, executing said modified program machine code, storing a time series of said states during said executing, restoring a said stored state, and executing said modified program machine code forward in time starting at said restored state to return to said state in said program history of execution.

In some preferred embodiments the method further comprises partitioning the program machine code into a plurality of blocks each comprising a copy of a part of the program machine code and configured to execute the program instrumentation code after execution of the respective block; and then replacing an instruction to an operating system to create a new thread with machine code to control creation and execution of the new thread. The control code counts a number of blocks which have been executed to control the new thread execution.

These techniques allow debugging by stepping backwards and debugging by jumping to an arbitrary point in a program's execution history. Debugging is provided by a technique of snapshot and replay. To deal with operations such as system calls, non-deterministic instructions (e.g. RDTSC on Intel IA32), handling of asynchronous signals and handling of thread switches, a technique of record/replay can be employed to record the results of such an operation the first time a program is executed, and replay the results on the second and subsequent times the program is executed.

Thread switches can be handled by using thread 'multiplexing' to get deterministic threading. This can potentially lead to 'deadlock' situations, which can be overcome by using UNIX signals and EINTR feature to multiplex threads that block. Some system calls have known results, so only these results need be recorded. However, other system calls may have unknown or unpredictable results, so in order to replay these later the state of the whole system after executing a system call may be recorded by use of snapshots.

Shared memory presents an additional problem, as memory may be written to by the target program and also by another program(s). In order to record these memory transactions so as to be able to replay them later, the processor may map shared memory read-only, and record transactions on memory faults. An alternative shared memory strategy would be to instrument memory reads as for machine code instructions associated with non-deterministic events.

Snapshot thinning may be used to reduce the number of snapshots stored. As the program executes, snapshots taken a long time in the past may be selectively discarded, provided they are not snapshots taken, for example, as a result of a system call. For example, snapshots taken more than a period such as 10 or 100 seconds ago may be discarded and/or a proportion such as one in ten or one hundred snapshots may be retained.

In addition to registers of a processor on which the program is running, working memory space to which the program has access and operating system resources allocated to the program, the exact number of executed instructions may be recorded. This may be used to determine which state is returned to in the history of execution of the computer program. Alternatively, the state may be determined by a register value, such as the program counter, or the stack pointer, or a data register such as an accumulator or by the contents of one or more memory locations. It may also be determined by the number of blocks of deterministic instructions executed in the history of execution of the computer program.

In some preferred embodiments the method includes inputting one or more said search criteria for identifying a state in the history of execution of the program; identifying a most recent said stored state matching one or more search criteria; and searching forward in time from said most recent stored state to determine a most recent said state in said history of execution of said program matching said one or more search criteria. Thus is embodiments broadly the current is, once the most recent point at which the state was identified going back and play forwards once again to that state. For example: we have been executing our program for 2 s; we have a snapshot at 1 s, and the criteria match at 1.5 s into the program's history. We go back to 1 s, and play forwards to 1.5 s, where we detect that the search criteria are met. We need to continue play forwards from 1.5 s to 2 s, just in case there is a more recent time in the program history when the criteria are met that is, how do we know 1.5 s is the only time the criteria are met? When we get to the end of the program history, we then know that 1.5 s was definitely the most recent time the criteria were met. So, we go back to the snapshot at 1 s, and play forwards once again to 1.5 s.

According to another embodiment of the invention there is provided a method of going back from a point in the execution of a program to an earlier point in the execution of the program, the method comprising capturing and storing a series of snapshots of the execution of the program, a said snapshot comprising a set of values of one or more of registers of a processor on which the program is running, working memory space to which the program has access and operating system resources allocated to the program, inputting one or more search criteria to identify said earlier point in the execution of the program, executing said program forward from a first said snapshot to search for an earlier point in said execution meeting said one or more search criteria, and executing said program forward from a previous said snapshot to search for said earlier point in said execution meeting said one or more search criteria if said searching from said first snapshot is unsuccessful.

According to a further embodiment of the invention there is provided a method of monitoring computer program code execution of a processor connected to a memory, the method comprising partitioning the computer program code into first portions of code comprising instructions for linear computer program code execution and second portions of code comprising instructions for non-linear computer program code execution, executing said computer program code by executing a said first portion of code and by evaluating to which point in the computer program code a said second portion of code following said executed first portion of code would, if executed, transfer execution, and continuing executing of said computer program code at that point, and storing at least one snapshot of computer program code execution during said executing, said snapshot comprising at least one of register values of the processor and memory values of the memory.

According to a yet further embodiment of the invention there is provided a method of going to an arbitrary point in computer program code execution of a processor connected to a memory, said arbitrary point being determined by a selection criterion, the method comprising partitioning the computer program code into first portions of code comprising instructions for linear computer program code execution and second portions of code comprising instructions for non-linear computer program code execution, executing said computer program code by executing a said first portion of code and by evaluating to which point in the computer program code a said second portion of code following said executed first portion of code would, if executed, transfer execution, and continuing execution of said computer program code at that point; storing at least one snapshot of computer program code execution during said executing, said snapshot comprising at least one of register values of the processor and memory values of the memory, and selecting a said snapshot, restoring register values of the processor and memory values of the memory to those in the snapshot and continuing execution from that point until the selection criterion has been met, to go to said arbitrary point.

Preferably the snapshot contains values of substantially all (or all used) registers; preferably the snapshot contains values of substantially all (or all used) memory values (in the memory space for the program). Preferably the snapshot contains values of substantially all (or all used) operating system resources.

According to another embodiment of the invention there is provided a method of going to an arbitrary point in computer program code execution of a processor connected to a memory, said arbitrary point being determined by a selection criterion, the method comprising partitioning the computer program code into first portions of code comprising instructions for linear computer program code execution and second portions of code comprising instructions for non-linear computer program code execution, executing the first portions of code, evaluating at which point in the computer program code the second portions of code would transfer execution and continuing execution at that point, until the selection criteria have been met, to go to said arbitrary point.

According to a further embodiment of the invention there is provided a carrier carrying first computer program code for implementing a method of going to an arbitrary point in execution of a second computer program on a processor connected to a memory, said arbitrary point being selectable by a selection criterion, the first computer program code comprising a module for partitioning the second computer program into first portions of code comprising instructions for linear computer program code execution and second portions of code comprising instructions for non-linear computer program code execution, a module for executing said computer program code by executing a said first portion of code and by evaluating to which point in the computer program code a said second portion of code following said executed first portion of code would, if executed, transfer execution, and continuing execution of said computer program code at that point, a module for storing snapshots of computer program code execution, each snapshot comprising at least one of register values of the processor and memory values of the memory, a module for selecting a snapshot and restoring register values of the processor and memory values of the memory to those in the snapshot, and a module for continuing computer program code execution from a snapshot until said selection criterion has been met.

According to a further embodiment of the invention there is provided a backwards debugger, the debugger comprising: code to record data identifying a state of a program for backwards debugging whilst said program is running in a forwards direction; and code to provide an effective backwards debugging function by running said program forward from a said state; and wherein said debugger further comprises: code to handle non-deterministic events in said program, said non-deterministic events comprising one or more events selected from the group consisting of: a thread switch event; an asynchronous event; and a data read from memory shared with a second program, process or device.

Broadly speaking in embodiments the backwards debugger is configured to identify the non-deterministic events and to log these as they occur so that when the code is replayed they can be synthesised based on the log to enable replay to any earlier state of the program. Thread handling, however, provides some particular difficulties which in embodiments are addressed by "instrumenting" the program code to allow a thread switch event to be watched whilst, preferably, still permitting the operating system to choose which particular thread is executed (since this latter is a relatively complex task, to ensure fairness between the threads over time so that each gets its turn).

Thus in preferred embodiments a mutex is employed over the whole program which is being backwards debugged so that only one thread executes at a time (mutex being derived from "mutual exclusion"). In the context of such embodiments program is used broadly to mean code comprising multiple threads which, were the (debugging) mutex not present could run simultaneously. Kernel threads are excluded since even with the mutex a program thread and a kernel thread may run simultaneously. In embodiments the code to record data identifying a state of the program comprises code to modify the code of the program to add instrumentation code, in particular to log/and or provide a degree of control over the non-deterministic events. Thus in the case of thread switching the instrumentation code adds to each thread instructions to drop and then take the debugging mutex. The presence of the debugging mutex stops all except one of the threads from running (this control being applied by the operating system), and the drop and take instructions permit thread switches, but in a controlled manner. Without the debugging mutex the operating system would schedule the threads in a pseudo-random fashion which would be difficult to replay. Instead the backwards debugger is able to log thread-related data when the drop/take mutex event occurs, in particular to identify the next thread which is started. In this way the thread switching of the programme running in a forwards direction can be recreated by the backwards debugger by replaying from a known state and synthesising the thread switch event which actually occurred, in this way enabling the backwards debugger to go back to an earlier state of the program.

In a multiprocessor system the mutex ensures that only a single processor is operating at any one time rather than, for example, parallel threads on different processors.

One additional difficulty with the above technique arises when more than one mutex is present, in which case two or more thread may block each other resulting in deadlock. To address this problem in embodiments of the invention the backwards debugger identifies all the times when there is potential for this to happen, essentially when a thread performs a system call, more particularly a blocking system call, and at this point the debugging mutex is released to allow the system call to be made. After the system call the same thread once again picks up the debugging mutex.

A still further subtlety arises because system call code can run in parallel with a thread holding the debugging mutex—that is a kernel thread and a program code can be running simultaneously. This can cause difficulty when both these threads access shared memory, more particularly when they read data from memory shared with a second program, process or device (an example of the latter being hard disk direct memory access, DMA). To address this preferred embodiments of the backward debugger subvert the system call so that data which would have been read into the programme is instead stored in the event log and then on return from the system call after the debugging mutex has been taken, the data from the event log is copied to the location at which the program asked for it to be stored. In practice this is straightforward to implement, for example by changing one or more pointers. In this way it can be ensured that the memory used by the programme is only modified when the debugging mutex is held.

To handle other non-deterministic events such as reading data off a network the instrumentation code is preferably configured to put a copy of the read data into the event log. With a system call, for example as described above, the result of the system call is preferably stored into the event log so that they system call can be dispensed with at replay, in this way avoiding the non-determinism.

Where a non-deterministic event comprises an asynchronous event, for example when the program includes a signal handler for a timer signal, then preferably the instrumentation code is configured to record the occurrence of the event and when the event occurred in the event log so that the asynchronous event can be reproduced on replay.

Where a non-deterministic event comprises a read from shared memory, for example as described above, again the read data is preferably stored in the event log and read from the event log at (forwards) replay to simulate backwards execution of the programme. Preferably the backwards debugger detects automatically the ranges of memory that are shared by inspecting system calls made by the program being debugged as it executes; alternatively the debugger may incorporate a system to allow a user to input data defining a shared range of memory, and then this can be used to determine when a shared memory access event occurs.

A related embodiment of the invention comprises a method of handling non-deterministic thread switch events in a backwards debugger backwards debugging a program, the method comprising: modifying code of said program to add mutex drop followed by mutex take instructions to each thread of said program; logging data identifying a new thread to take said mutex following a said mutex drop; and recreating said thread switch events during said backwards debugging using said logged data.

Further Techniques for Deterministic Reply of Computer Programs

According to an aspect of the present invention there is provided a non-transitory computer readable medium having computer executable instructions for implementing a method of deterministic reply of a computer program, the method comprising: identifying in machine code representing said program, instances of machine code instructions for a first process that accesses a portion of shared memory; identifying a second process that accesses said shared portion of memory; wherein both said first and second processes have read and write permissions to access said shared portion of memory; modifying said program machine code such that one of processes has read and write permission to access said shared portion of memory and the other said process has only read permission to access said shared portion of memory; identifying when said other process attempts to write to said shared portion of memory; and executing an instruction sequence in response to said identifying of said attempted write.

The modifying of the program machine code preferably comprises modifying the program machine code such that an attempted write by the other process results in a memory protection fault such as a page fault. The identifying of the attempted write may then identify this. Preferably the executing of the instruction sequence comprises mapping the shared portion of memory to the other process, in embodiments then storing values from the shared memory portion for later deterministic reply of the computer program.

In embodiments the deterministic replay of the computer program comprises a method of returning to a state in the history of execution of the program, the state comprising a set of values of one or more of registers of a processor on which the program is running, working memory space to which the program has access and operating system resources allocated to the program. The method then records sufficient data to enable the effect of asynchronous modification of the shared portion of memory by the first and second processes to be replayed deterministically.

In embodiments the method includes modifying the program machine code to execute a program instrumentation set of machine code instructions to handle substantially non-deterministic events; executing the modified program machine code, storing a time series of the states during the executing; restoring the stored state; and executing the modified program machine code forward in time starting at the restored state to return to the state in the program history of execution. Thus in preferred embodiments the computer executable instructions comprise instructions for implementing a backwards debugger. In some preferred embodiments the first and second processes comprise concurrent threads of the computer program.

BRIEF DESCRIPTION OF THE DRAWINGS

These and other aspects of the present invention will now be further described, by way of example only, with reference to the accompanying drawings in which:

FIG. 2 shows an example Linux program;

DETAILED DESCRIPTION OF PREFERRED EMBODIMENTS

Broadly a backwards debugger allows a program to be executed in such a manner that it appears that the execution is backwards, that is in a reverse direction to the normal direction of program code execution. Thus in embodiments a backwards debugger is a debugger that allows a program being debugged to be rewound to an earlier state, and then allows the user to inspect the program's state at that earlier point. Such a debugger ideally provides commands to allow the user to step the program back in small well-defined increments, such as single source line; a machine instruction; step backwards into, out of, or over function calls and the like.

We will describe bidirectional or backwards debugging—a technique where, in preferred embodiments, the complete state of a running computer program can be examined at any point in that program's history. This uses a mechanism to 'unwind' the program's execution. This is a difficult problem, because as a program executes previous states are generally irretrievably lost if action is not taken to record them (for example, writing to a memory location causes whatever information was previously at that memory location to be lost). There are two approaches to solving this problem: firstly to log every state transition as the program executes; secondly, to re-execute the program from an earlier recorded state to reach the desired point in its history. The first suffers from several problems, including slow forwards execution of the program, and the generating of large amounts of data as the program executes. The second approach is generally more efficient but requires that non-determinism be removed on re-execution so that the program follows exactly the same path and transitions through exactly the same states each time it is re-executed.

Figure 1:
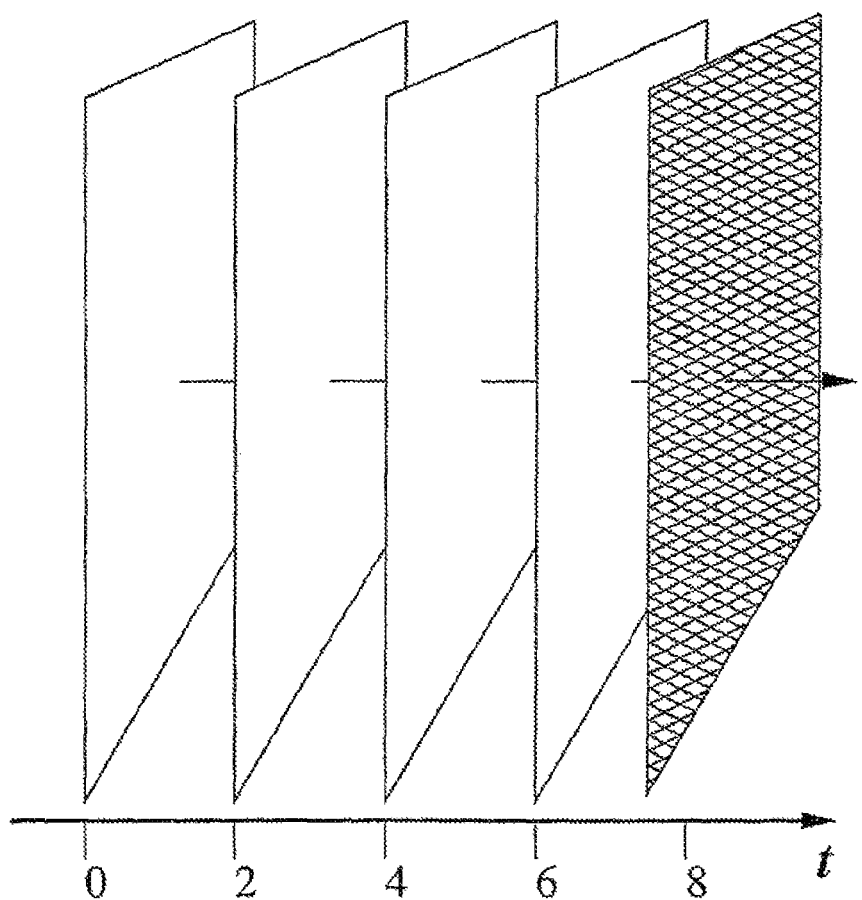
FIG. 1 shows a running program with snapshots at regular 2 second intervals according to an embodiment of the present invention.

We describe a mechanism whereby a 'snapshot' is periodically taken of a program as it runs. To determine the program's state at a given time t in its history, we start with the snapshot taken most recently before time t, and execute the program forwards from that snapshot to time t. For example, FIG. 1 depicts a program under execution. The program has been running for a little over 7 seconds, with snapshots having been taken every 2 seconds. In order to find the state of this program at t=5 s the snapshot taken at 4 s is replayed for 1 s. We use the inherent determinism of a computer to ensure that the when the snapshot of the program is replayed to time t, it will have exactly the same state as had the original program at time t. The UNIX fork system call provides one mechanism to snapshot a process.

Unfortunately, while a computer itself is deterministic, computer programs do not run deterministically, due to non-deterministic inputs. That is, when we say a computer is deterministic we mean that given the same set of inputs, it will always run through the same state changes to the same result. Therefore, if we wish to ensure that a snapshot of a program is replayed exactly as the original, we should ensure that exactly the same inputs are provided to the replayed program as were provided to the original.

Fortunately, most modern, 'protected' operating systems provide a sanitised 'virtual environment' in which programs are run, commonly referred to as a process. An important feature of processes in this context is that they strictly limit the computer resources that are accessible to a program, making it practical to control all sources of non-determinism that may influence a program's execution. These resources include the memory that is accessible by the process, as well as operating system resources, such as files and peripherals. We define all such resources as the process state. The memory and register set of a process make up its internal state, while operating system resources that it may access make up its external state. The controlled environment of a process means that with the help of instrumentation (see section 3) it is practical in embodiments of our system to eliminate substantially all significant sources of non-determinism during the process' execution.

We have identified four categories of non-determinism for a computer process executing on a protected operating system:

1) Non-deterministic instructions are instructions which may yield different results when executed by a process in a given internal state. The most common form of non-deterministic instruction is the system call (i.e. the instruction used to make a request of the operating system). For example, if a process issues a system call to read a key press from the user, the results will be different depending on which key the user presses. Another example of a non-deterministic instruction is the Intel IA32 rdtsc instruction, which obtains the approximate number of CPU clock ticks since power on.

2) A program executing multiple threads will show non-determinism because the threads' respective transactions on the program's state will occur in an order that is non-deterministic. This is true of threads being time-sliced onto a single processor (because the operation system will time-slice at non-deterministic times), and of threads being run in parallel on multiprocessor systems (because concurrent threads will execute at slightly different rates, due to various external effects including interrupts).

3) Asynchronous events are events issued to the process from the operating system that are not the direct result of an action of that process. Examples include a thread switch on a multithreaded system, or a timer signal on a UNIX system.

4) Shared memory is memory that is accessible by more than one process. If a process' memory may be written by another, since the two processes operate independently, this will result in non-determinism.

Preferably a bidirectional or backwards debugging system should be able to work in all circumstances, and preferably therefore the aforementioned sources of non-determinism should be eliminated. To achieve this, all non-deterministic events are recorded as the debugged process executes. When replaying from a snapshot in order to obtain the program's state at some earlier time in history, the recorded non-deterministic events are faithfully replayed. The mechanism used to employ this is described in the following section.

We employ a technique of machine code instrumentation in order to record and replay sources of non-determinism. Our instrumentation is lightweight, in that it modifies the instrumented program only slightly, and is suitable for use with variable length instruction sets, such as Intel IA32.

We instrument by intercepting control flow at regular intervals in the code. Sections of code between interception are known as basic blocks. A basic block contains no control flow instructions, and no non-deterministic instructions—that is, a basic block contains no jumps (conditional or otherwise) or function calls, nor system calls or other non-deterministic instructions, or reads from shared memory. Control flow and non-deterministic instructions are therefore termed basic block terminators.

An instrumented program is run such that all the basic blocks are executed in the same order and with the same results as would be the case with its equivalent uninstrumented program. The instrumentation code is called between each basic block as the instrumented program executes. Each of the program's original basic blocks are copied into a new section of memory, and the basic block terminator instruction is translated into one or more instructions that ensure the instrumentation code is called before control continues appropriately.

As an example, consider the Linux program shown in FIG. 2, written in Intel IA32 assembler (using GNU/AT&T syntax):

This simple program reads characters from stdin, and echos them to stdout. The program contains four basic blocks, terminated respectively by the two int $0x80 instructions, the jne and the ret instruction at the end.

For convenience, we term the uninstrumented program P, and its instrumented equivalent P'. For each basic block there is an uninstrumented basic block $B_n$, and a corresponding instrumented basic block $B'_n$.

Figure 3:
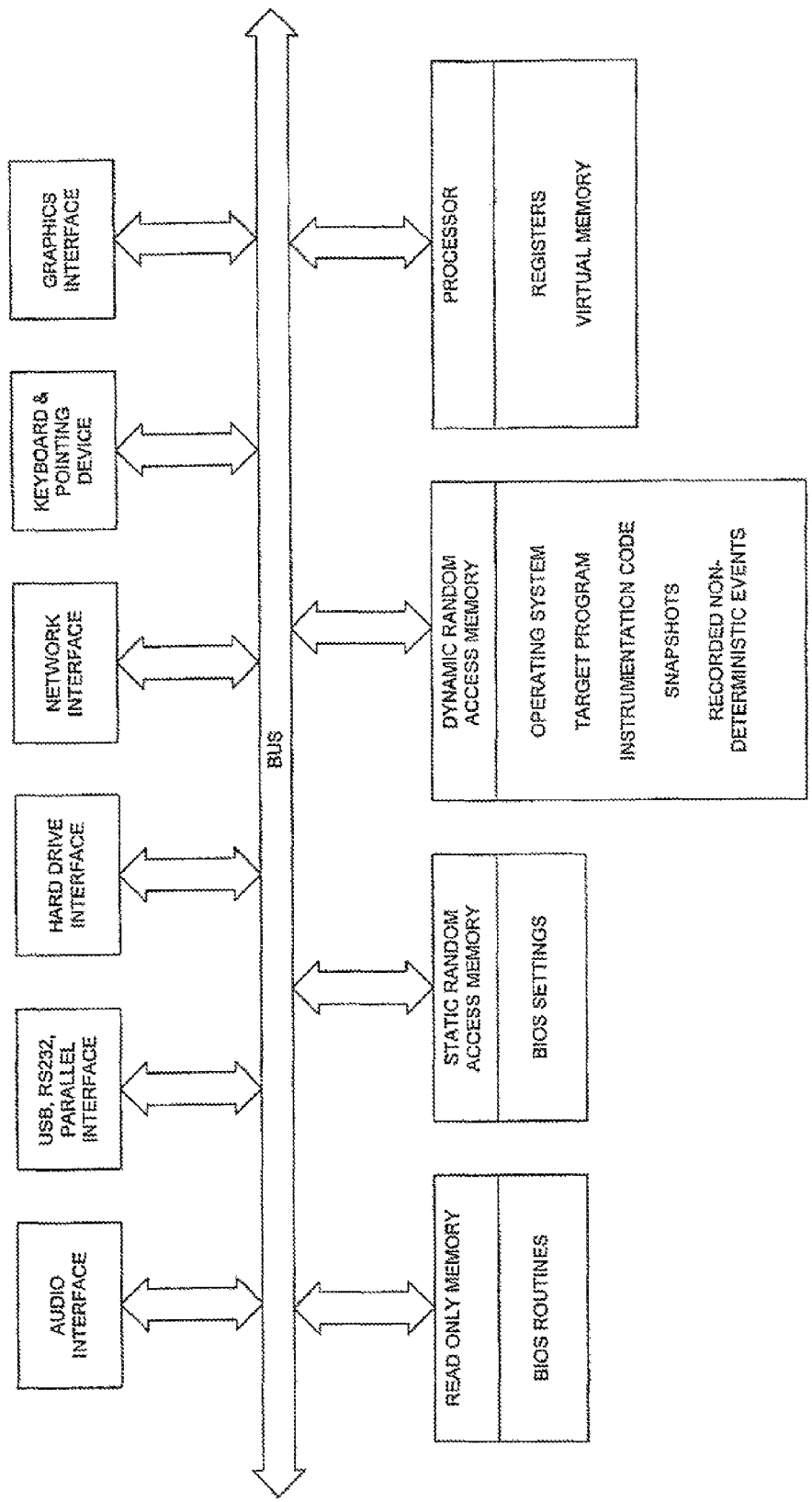
FIG. 3 shows an example of a computer system.

FIG. 3 shows an example of a computer system on which the program may be executed and on which bi-directional debugging may be performed. The target program and the debugger both reside in physical memory. Processor registers may be captured and stored in snapshots along with memory used by the target program process. The debugger may operate within the virtual memory environment provided by the processor and the operating system, or it may operate on a single process computer.

Figure 4:
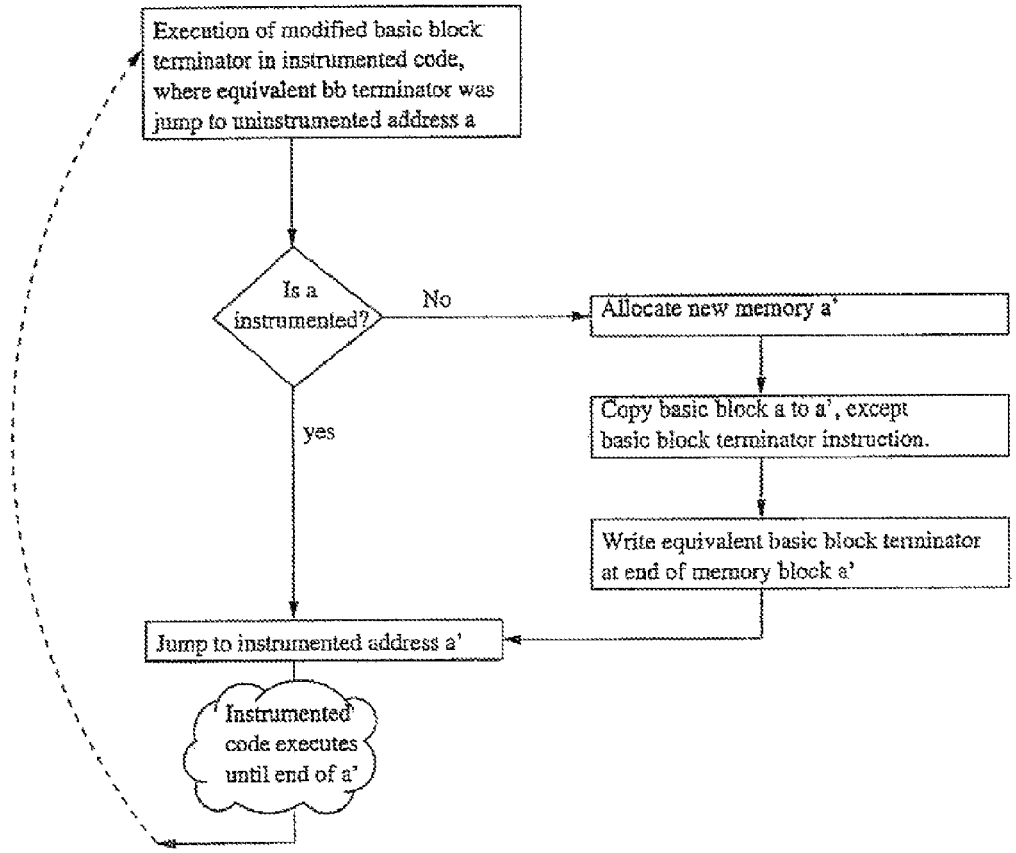
FIG. 4 shows a flowchart showing the instrumentation algorithm according to an embodiment of the present invention.

FIG. 4 shows a flowchart that illustrates the instrumentation algorithm. (Note that algorithm instrumented code in an 'on-demand' fashion, as that program executes; an ahead of time algorithm is also practical.)

Figure 5:
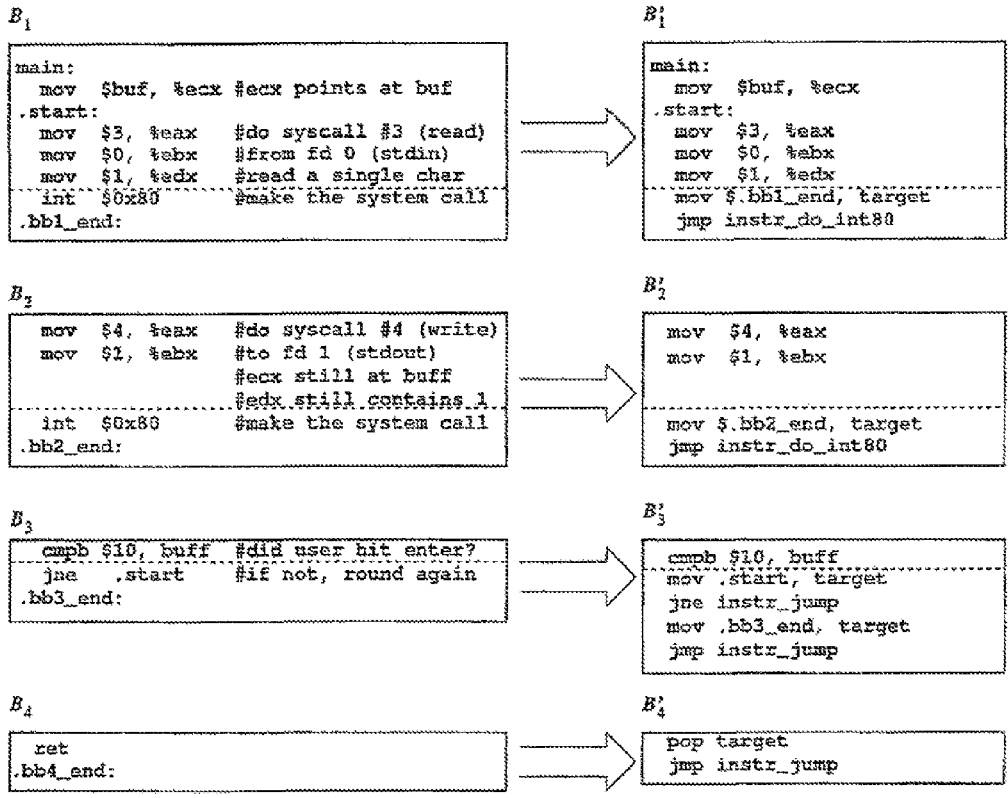
FIG. 5 shows the program P and its instrumented counterpart P' according to an embodiment of the present invention.

FIG. 5 shows the program in the previous example broken into its four basic blocks, and how those basic blocks are copied, and how the basic block terminator instruction for $B_n$ is replaced in $B'_n$ with one or more instructions that branch into the instrumentation code. The label target is used to store the uninstrumented address at which control would have proceeded in the uninstrumented version of the program; the instrumentation code will convert this to the address of the corresponding instrumented basic block and jump there.

The copying and modifying of basic blocks for instrumentation may be carried out statically before the program is executed, or may be done dynamically during the program's execution (i.e. on demand). Here, when the instrumentation code looks up the address of an instrumented basic block given the corresponding uninstrumented address, if the instrumented version cannot be found then the uninstrumented block is copied and the basic block terminator translated. (Our implementation uses the dynamic approach.)

We will next describe making replay deterministic. Using the instrumentation technique described in 3 we are able to remove all sources of non-determinism from a process. We deal with each of the three kinds of determinism separately in subsections below.

Non-deterministic instructions: When the process executes for the first time, it is said to be in 'record mode'. Here, the results of all non-deterministic instructions (including system calls) are recorded in an event log. When playing a process forwards from a snapshot in order to recreate a previous state, the process is said to be in 'replay mode'. Here, the instrumentation code ensures that non-deterministic instructions are not executed, and instead their results are synthesised using data stored in event log. There the process' internal state is artificially reconstructed to reflect the results of the corresponding non-deterministic instruction produced when executed in record mode.

For example, when replaying a system call, this means restoring the system call's return code, as well as any of the process's memory that was modified as a result of the system call.

External state (operating system resources): Note that it is not necessary to reconstruct the process' external state when recreating the results of non-deterministic instructions, because the process' interaction with its external state is in general governed entirely through system calls. For example, consider a process running in record mode that opens a file for reading. The process will receive a file descriptor (also known as a file handle) which it will use with future calls to the OS to read from the file. The file descriptor is obtained and used with system calls. These system calls will be shortcut in the replay process. In effect, the instrumentation code will ensure that the replay process 'believes' that it has the file open for writing, but in fact it does not.

However, this is not true for OS resources that are visible from the process' internal state. As an example, consider a call to the OS to expand a process' address space (i.e. the memory it can access). Since this affects a resource which the replay process will access directly (i.e. memory), this system call should be reissued on replay to ensure that the effects of the non-deterministic instruction in question are faithfully replayed.

Note that memory mapped files are not treated specially; the entire contents of the file that is mapped are preferably recorded in the event log so that the effects of the memory map operation may be replayed. This is because the memory mapped file may be in a different state (or may not even exist) during replay. However, it is possible to optimise this case by recording and replaying the on-demand mapping of pages of such files. Here, when a process maps a file in record mode, the instrumentation code ensures that the process does not really map the file, although the instrumented program is 'unaware' of this. This means that when the process attempts to access the pages of the file it believes are mapped, it will fault. The instrumentation code intercepts these faults, and maps the pages from the file, recording the contents of those pages in the event log. On replay, again the file is not mapped. However, this time when the replay process faults accessing the pages, the instrumentation code obtains the contents of those pages from the event log, and maps the pages and initialises them appropriately. Alternatively, memory mapped files may be considered as shared memory, and dealt with as described below.

Asynchronous events: It is important in embodiments that asynchronous events are replayed exactly as they occur during record mode. In record mode, we use instrumentation to obtain a sufficient level of control over when asynchronous events happen, so that these events may be faithfully reproduced in replay mode. This means that all asynchronous events are preferably delivered to the instrumented program at basic block boundaries.

Asynchronous messages: Many modern operating systems provide a facility where an application can register an asynchronous event handling function. When the asynchronous event occurs, the operating system interrupts the program, transferring control directly to the handler function. When the handler function returns, the program proceeds as before interruption. This mechanism is often referred to as asynchronous signal delivery, or software interrupt servicing.

Such asynchronous events are preferably controlled to ensure that they are essentially entirely repeatable. To achieve this, while running in record mode, the instrumentation code intercepts system calls to set up a handler for an asynchronous message. The request is manipulated such that the instrumentation intercepts asynchronous messages.

Figure 6:
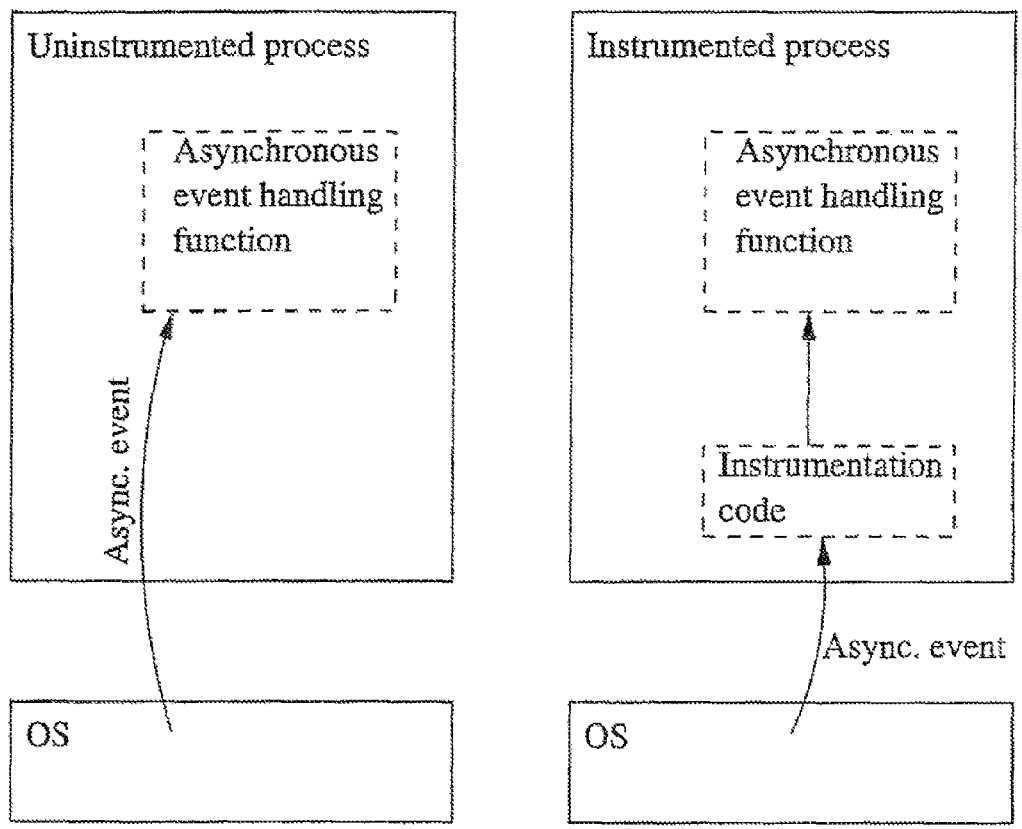
FIG. 6 shows interception of asynchronous events according to an embodiment of the present invention.

This is depicted in FIG. 6. The instrumentation code does not deliver the asynchronous notification directly to the program (i.e. it will not directly call the program's asynchronous event handler function). Instead the instrumentation code's event handling function will simply set a flag and return. At the end of each basic block boundary, the instrumentation code checks this flag, and if it is set will call the program's asynchronous event handler. In addition, the occurrence of the asynchronous event is recorded in the event log.

When replaying, asynchronous events are not delivered to the replay process at all. Instead, each time a basic block is executed, the event log is checked. If an event is scheduled for the current basic block, then the process's event handling function is called, thus faithfully replaying the asynchronous event.

As well as providing determinism, this mechanism also ensures that the asynchronous event handling function is instrumented when it is called. Otherwise, if the operating system is allowed to call the program's event handling function directly, then the original, uninstrumented code will be called, and we will 'lose' instrumentation.

Note that message-based systems such as Microsoft Windows® use a system call to retrieve the next message from a message queue; the mechanism outlined in section 4.1 covers this case.

Threads: There are two main ways to implement multi-threading within a process: kernel managed threads, and user managed threads. With user-managed threads, a user-mode library is responsible for threading. Thread pre-emption is performed by the library by responding to asynchronous timer events—hence any non-determinism resulting from user-managed multithreading can be removed using the techniques described in the section on Asynchronous events.

However, most modern computer systems use kernel-managed threads. Here the operating system kernel is responsible for switching and otherwise managing threads, in general entirely without direct support from the application. There are several mechanism that can be employed to obtain deterministic kernel-managed threads.

One technique is to use the instrumentation code to implement 'virtual-kernel-managed threads', which involves the instrumentation code effectively providing user-managed threads, but letting the application 'believe' it is using kernel managed threads. Here, the system call to create a new kernel managed thread is intercepted by the instrumentation code, and subverted such that the instrumentation code creates a virtual kernel-managed thread within the single real kernel managed thread. The instrumentation code multiplexes all virtual kernel-managed threads onto a single real kernel-managed thread. This means that thread switching is under control of the instrumentation code, and in embodiments can be made essentially entirely deterministic. The instrumentation code can provide pre-emptive multithreading by effecting a virtual kernel-managed thread switch every n basic blocks (e.g. where n=10,000).

Here, care must be taken if we wish to ensure deadlock is avoided. If a virtual kernel-managed thread blocks waiting for the action of another virtual kernel-managed thread, since both virtual threads are running within a single real thread, deadlock can result. (A particularly common example of this problem is when two virtual kernel-managed threads contend on a mutual exclusion primitive; if care is not all virtual kernel-managed threads will deadlock). One way to avoid deadlock on a UNIX system to periodically arrange for the process to be delivered an asynchronous timer signal, such that blocking system calls will be interrupted, returning EINTR.

An alternative mechanism involves letting the program create kernel-managed threads as normal, but subverting the thread creation such that the instrumentation code has control over which thread is executing at which time. This might involve modifying the threads' priorities such that the instrumentation code can control which thread the OS will execute, or perhaps artificially blocking all but one thread at a time by e.g. having all kernel managed threads contend on a single kernel-managed mutex (which we shall call 'the debugging mutex'. This technique would also suffer a similar deadlock problem referred to above. Here if the kernel-managed thread that owns the mutex waits for an operation to be completed by another thread, the system will deadlock. (This is because the other thread will never be able to complete its work because it is waiting for the debugging mutex, yet the thread that owns the debugging mutex will never release it because it is waiting for that other thread.) Fortunately, the only way a thread can block awaiting the result of another is through a system call. Therefore, this problem can be overcome by ensuring that any thread drops the debugging mutex before entering any system call that may block, and then takes it again on return from said system call (note that there is no problem if a thread "busy-waits" because eventually it will execute a maximum number of basic blocks and then drop the debugging mutex). However, if the debugging mutex is to be dropped when a system call is issued, care must be taken to ensure that the system call does not modify the program's internal state in a way that voids determinism. For example, if the system call is reading data off the network and writing that data into the program's address space while concurrently another thread that holds the debugging mutex is reading that same memory, non-deterministic behaviour will result. Fortunately, this problem can be avoided be having the system call read not into the program's internal state, but into the event log. After the debugging mutex has been taken on behalf of the thread that issued the system call, then the data that was read by the system call into the event log can then be copied into the program's internal state. This trick can be implemented with relatively little work, since we already have the requirement that system calls that write into user memory have their results stored in the event log. Therefore, rather than have the system call read into program memory and then copying that data into the event log, we instead subvert parameters to the system call such that data is read directly into the event log, and have the instrumentation code subsequently copy from the event log into program memory, but only once the debugging mutex has been taken.

Shared memory: If a process being debugged shares memory with another process, it is possible to exploit the operating system's memory protection mechanism to provide deterministic replay.

Suppose that there are two processes, A and B, that share some portion of memory M, such that both processes have read and write permissions to access M. Process A is being run under instrumentation for bidirectional debugging, but process B is not. The shared memory M is initially mapped such that process B has read-only access, and A has full access. We describe this situation as process A having ownership of memory M. Any attempt by process B to read memory M will succeed as normal, but any attempt by process B to write to M will result in a page fault. This fault is responded to by memory M being mapped read/write to process B, and unmapped completely from process A. We refer to this process B taking ownership of the memory. Here, any attempt to access M (either for reading or for writing) by A will result in a page fault. This is responded to by reverting ownership of M to A, but in addition sufficient state being stored in the event log to replay the changes to M made by B. That is, the difference of the memory M between the point when A last had ownership of that memory and the current time is stored in the event log.

When replaying, the difference in memory is retrieved from the event log and applied at the appropriate time. Thus the effect on A of B's asynchronous modification of memory M can be replayed deterministically.

Note that the above scheme can easily by generalised so that process B is actually a group of one or more processes.

An alternative approach is to record in the event log every memory read performed by A on the shared memory M. This has the advantage of being a simpler implementation, but depending on the usage of the shared memory may result in the recording of an unacceptable amount of state in the event log, as well as adversely affecting temporal performance.

We will next describe implementation and structure of the event log. As we have seen, there are several kinds of events that need to be recorded in the event log: Non-deterministic instruction results (including the return codes and memory modifications made by system calls), Asynchronous events (including asynchronous signal delivery), Thread Switches, and Shared memory transactions.

In preferred embodiments the memory used to store the event log is accessible by the process in record and replay mode. This means that if the UNIX fork facility is used to snapshot processes, then the memory used to store the event log should be shared between each process created with these forks. However in preferred embodiments the event log (and all memory used by the instrumentation code) is not usable as the internal state of the program being debugged; to prevent this all memory transactions by the program being debugged can be intercepted by the instrumentation code, and access to memory used by the instrumentation code (including the event log) can be denied to the program being debugged.

In preferred embodiments, the event log itself is stored as a linked list, where each node contains the type of event, data sufficient to reconstruct that event during replay, and the basic block count at which that event happened. (An event's basic block count is the number of basic blocks that have been executed in the original record process when the event occurs. This means that there is a correlation between time t and the basic block count; or more precisely, since we structure things such that all non-deterministic events happen at a basic block boundary, the basic block count—not seconds or nanoseconds—is the fundamental unit of t.)

Then when in replay mode, between each basic block it is necessary only to inspect the current basic block count, and compare it with the basic block count of the next non-deterministic event in the event log. In the common case that the current basic block count is less than the basic block count for the next non-deterministic event, the next basic block can be executed without further delay.

We will next describe searching history. In general, it is more useful for a bidirectional debugger to be able to search history for a particular condition, as opposed to wind a program back to an absolute, arbitrary time. Some examples of the kinds of conditions it is useful to be able to search are:

The previously executed instruction
The previously executed source code line
The previously executed source code line at the current function call depth
The call site for the current function
The previous time an arbitrary instruction or source code line was executed More generally, it is useful to be able to rewind a debugged program to the previous time an arbitrary condition held, such as a variable containing a given value, or even completely arbitrary conditions, such as some function returning a particular value.

We have implemented an algorithm to search an execution history for such arbitrary conditions. The most recent snapshot is taken, and played forward testing for the condition at the end of each basic block. Each time the condition holds, the basic-block count is noted (if a basic-block count is already recorded because the condition held earlier, it is overwritten). When the history is replayed up to the current position, the most recent basic block at which the condition held will be stored. If no basic block count has been recorded because the condition did not hold since the most recent snapshot, then the search is repeated starting from the next most recent snapshot, up to the most recent snapshot. That is, suppose that the debugged program is currently positioned at basic block count 7,000, and there are snapshots at basic block counts 0; 2,000; 4,000; and 6,000. We start at the snapshot at count 6,000 and play forwards until count 7,000, testing for the condition between each basic block. If the condition never holds between counts 6,000 and 7,000, then we rewind to the snapshot taken at 4,000, and play that forwards to 6,000, searching for the event. If the condition still isn't found to hold, we check 2,000-4,000, and so on.

Note that this algorithm will not work reliably with the instrumentation technique described in section 3 if searching for the most recent time at which a variable held a particular value. This is because a variable's value may change to and then from the required value entirely within a basic block. To overcome this, there is an enhancement to the instrumentation technique described in section 3—each memory write operating is considered a basic block terminator. (This approach can also be used to ensure that a program that has gone hay-wire does not write over the event log or other instrumentation data structures.) This form of instrumentation will operate less efficiently than the one described in section 3; however should the performance become problematic, it is possible to run with both forms of instrumentation, switching between the two as necessary.

(Note that the algorithm described in this section does work reliably when searching for particular values of the program counter with the instrumentation technique described in section 3.)

We have described a bidirectional debugging mechanism that can be conveniently implemented on most modern operating systems for example including, but not limited to, Linux and Windows®. A process can be rewound and its state at any time in its history can be examined. This is achieved by regularly snapshotting the process as it runs, and running the appropriate snapshot forward to find the process' state at any given time. Non-determinism may be removed using a machine code instrumentation technique.

Our implementation for the Linux operating system is responsive and pleasant to use, and promises to greatly reduce debugging times for particularly subtle and difficult bugs. We have also implemented a searching technique that permits the most recent time that an arbitrary condition holds in a process's history.

Our technique of instrumenting machine code rather than source-level analysis is particularly important, because it means the system copes with bugs where the compiler-dictate control flow is subverted (e.g. overwriting a function's return address on the stack).

Further Techniques for Deterministic Reply of Computer Programs and Related

We now describe further aspects of the invention which relate to a method for instrumenting execution of a computer program such that sufficient information may be recorded in an efficient manner to provide deterministic replay of the said computer program in the light of shared memory accesses, and when the said computer program is multithreaded.

In embodiments the techniques we describe for identifying processes with shared memory access, such as threads or multicore processes, comprise arranging process (thread) memory ownership to deliberate provoke memory page faults, to identify and handle concurrent memory access by multiple threads in such a manner as to enable deterministic replay, and hence backwards debugging.

Deterministic replay of a recording of a computer program can be achieved providing that (a) the program is replayed using the same starting state as the recording, and (b) inputs and other non-deterministic effects are synthesised to be replayed exactly as occurred during the recording. Such sources of non-determinism include:

i) the results of system calls (e.g. reading from a file or network)
ii) asynchronous signals
iii) non-deterministic instructions iv) reads from shared memory v) ordering of accesses to memory by concurrent threads Here we techniques to address with both (iv) and (v) by using the MMU (memory management unit) to fault on (i.e. trap) accesses to certain memory locations and use such traps to determine the ownership and memory and track different users of the memory.

1. Shared Memory

We define "shared memory" as memory whose contents when read by the program being debugged does not necessarily return the value most-recently written by the program being debugged. Typically this is because the memory is shared with another program which may write a new value to the memory location between the program being debugged writing and reading it back. Shared memory may also be updated in such asynchronous fashion by the operating system (asynchronous IO), or by a device to which the program being debugged has direct access (e.g. with kernel-bypass IO such as RDMA).

One way to record reads from shared memory such that they may be later replayed non-deterministically is to instrument all reads from memory, and for each access determine whether the address of the memory read is shared memory, and if it is, record to the execution log the value read from shared memory. This imposes significant overheads, in particular, every single access to shared memory must be checked.

A better way is to use the system MMU to determine which instructions access shared memory. Here, all shared memory is remapped to a new virtual address, which is unknown to the program being debugged. This is termed the "really shared memory". In its place is mapped a new mapping, which we refer to as the "emulated shared memory". The MMU is programmed (via a call to mprotect) such that any access to the emulated shared memory shall result in a memory protection fault (also referred to as a memory protection trap). All such faults are intercepted, and in response to this the code that triggered the fault is retranslated such that when accessing memory it first checks the address to determine whether it is shared, and so (a) redirects the access to the "really shared memory" address, and (b) stores values read from the really shared memory location in the execution log for later deterministic replay.

A further optimisation is to record in the execution log only those shared memory locations that have been modified since the previous access by the program being debugged. To achieve this, a third mapping accompanies the "emulated shared memory" and the "really shared memory", which is known as "the third copy". The third copy is is kept in sync with the really shared memory from the perspective of the program being debugged (in other words with the logical contents of the emulated shared memory). On access to the shared memory by the program being debugged, an event is added to the execution log only if the really shared memory and third copy differ.

The algorithm for a retranslated instruction that accesses shared memory is:

```
For each address A,... that the instruction accesses:
    If address A is shared:
        compute address A1 as the equivalent really shared memory address
        compute address A2 as the equivalent third copy address
        allocate a temporary variable T1
        If the instruction reads at A
            If the instruction also writes at A
                lock address A1
```

```
            copy contents of A1 into T1
            if the instruction reads at A and the contents of T1
            differs from the contents of A2:
                copy contents of T1 into A2
                create a new event in the execution log to indicate that this read from
                address A should be replayed to use the value now in T1.
            substitute T1 for A in the instruction
Execute instruction as modified
For each address A,... that the original unmodified instruction would access:
    If the instruction writes at A and address A is shared
        copy contents of T1 into A1
        If the instruction also reads at A
            unlock address A1
```

Locking an address prevents any other process from writing to it. The mechanism used to lock and unlock an address depends on the facilities provided by the hardware. On some types of computer, it may be possible to simply lock and unlock as described. On others, it may be possible only to determine whether another process has changed the contents of the address before writing back to it, and if so repeat the algorithm above again.

For the vast majority of programs, even those that make relatively heavy use of shared memory, the proportion of instructions actually accessing the shared memory is relatively small (compared e.g. to accesses to the stack). This technique ensure that only the relatively small proportion of instructions that access the shared memory have the extra overhead of dealing with shared memory, whereas most instructions run entirely unencumbered.

2. Multithreaded Execution 2.a The Model

The simplest way to deal with non-determinism due to differently-ordered accesses to memory by concurrent threads is to force serialisation of all threads when recording, and ensure that during deterministic replay each thread is executed in the same order as during record. In short, this means serialising all threads and recording thread switch events and execution log. However, such serialisation is unfortunate because it (a) slows down execution on multicore systems (i.e. only one of the CPU cores can be used at any one time), and (b) it changes the behaviour of the system compared to it being run normally (such lower fidelity can be mean bugs that are being investigated do not appear under the control of the debugger).

Here we present an improved mechanism that allows concurrent threads (processes) to be executed on multiple cores concurrently. It relies on the observation that multiple threads within a single (common) program is a similar arrangement to multiple programs using shared memory. i.e. the main difference between multiple threads and multiple programs is that multiple threads share memory. A variation on the technique described above for supporting deterministic replay of programs using shared memory can be used, allowing concurrent threads to be replayed without requiring strict ordering of memory accesses between those threads.

The idea is based on the observation that most memory locations referenced by most multithreaded apps will not in reality be "shared" between the multiple threads (e.g. most stack accesses). If memory within the program can be assigned an owning thread, and each thread is given its own execution log, threads' accesses to memory locations that they do not own can be treated as accesses to conventional shared memory, as described above.

Here, each memory location (or group of memory locations such as a page), is in one of the following states:

unused (all memory is initially in this state)

single-threaded (i.e. owned by a single thread; said thread is the only thread recently to have accessed this memory)

multithreaded—i.e. shared between multiple threads (more than one thread has recently accessed the memory)

Memory locations can change ownership over time in the following ways:

from unused to single-threaded,
from single-threaded to unused, or
from single-threaded to multithreaded, or
from multithreaded to unused (ownership never directly changes from one thread to another). When recording, any read or write of memory address P by a thread T1 results in different behaviour depending on the ownership of memory P:

Memory P is already owned by thread T1: continue as normal.

Memory P is currently unused: thread T1 takes ownership of memory P, a memory ownership event is added to T1's execution log, and then continue as normal.

Another thread T2 owns memory P: memory P is marked as multithreaded, a memory ownership event is added to T2's execution log, and the memory access continues as for shared memory accesses described above.

Memory P is multithreaded: the memory is accessed as per conventional shared memory as documented above; if necessary, a memory-read event is added to T1's execution log.

It desirable to allow memory locations to be changed from multithreaded to single-threaded in the case that the memory's access pattern changes (e.g. perhaps the memory is on the heap, and is being used by multiple threads but is then freed and reallocated for use by a single thread). To facilitate such a case, associated with each multithreaded memory location P is:

An identifier Tprev describing the most recent thread to access it, and

An integer N that holds of the number of consecutive accesses to it by thread Tprev For each access to multithreaded location P by thread T1, if P's Tprev is not T1, then P's Tprev is set to T1 and P's N is set to 0; otherwise, P's N is incremented. If P's N exceeds some threshold, the memory P is marked as being single-threaded and owned by T1, and a memory ownership event is added to T1's execution log.

When replaying, it is important to synchronise memory ownership events to preserve ordering of memory accesses between threads. Specifically, when thread T1 replays a memory ownership event such that it becomes the owner of memory P, it should not proceed until the previous owner thread T2 has replayed its memory ownership change event marking the corresponding memory as not owned by it.

To implement this model, it is desirable to be able reliable to track which memory locations are accessed by which threads.

2.b Implementation

The overheads of running on multiple cores concurrently (as opposed to running serially) will depend on the following factors (the values of which will depend on the implementation):

the relative proportion of the memory accesses by a thread that does not already own the memory being accessed, and the extra overhead incurred by a thread when accessing memory that it does not own (i.e. the memory is multithreaded), and the extra overhead incurred by a thread when accessing memory that it does own (i.e. the memory is single-threaded)

Three possible implementations are described below, each with different trade offs. In particular, the MMU can be used to trap accesses by a thread to memory which it does not own. This is attractive as it implies no extra overhead for a thread accessing memory it does own. Multiple threads within a process are not usually able to have different MMU mappings, but below we describe two ways this can be achieved (2.b i and 2.b ii). A third implementation alternative (2.b iii) is suggested, whereby the MMU is not used. This imposes some overhead even to accesses to single-threaded memory (as ownership must first be checked), but at the benefit of lower cost of accessing multithreaded memory.

2.b i—MMU-Based Multiprocess

As alluded to above, multiple threads within a process is logically equivalent to multiple processes sharing memory. For each thread created, in reality a new process is created, where all the memory is shared with the other "threads" of the program debugged (where these other "threads" are in reality other processes). Memory not owned by a thread (where in this context thread is in reality a process) should be mapped into the process at a different virtual address (effectively the "really shared mapping", as described in 1 above). Each process should also maintain a "third copy" for memory it does not own, again as described above.

In such an implementation, care would need to be taken to ensure correct operation of pan-process resources, including file-descriptors, signal handlers, resource limits, and newly-created memory mappings. In Linux, it is possible to create new processes with the CLONE_FS and CLONE_FILES flags, which eases this problem. Maintaining a perfect illusion of different processes being the same process is likely to be difficult to achieve.

2.b ii—MMU-Based Single-Process

It is possible to effectively give each thread within a process its own address space by offsetting each thread's memory access by some fixed amount, where each thread is assigned a unique offset such that the adding of any valid address to the offset does not yield another valid address. This could be achieved by translating code differently for each thread, applying the relevant constant offset to all memory accesses. The main disadvantage with such an approach is that it will put considerable pressure on the virtual address space. This is unlikely to be a problem in practice for programs with a 64-bit virtual address spaces, but is likely to be prohibitive for 32-bit address spaces.

2.b iii MMU-Less

Alternatively one could avoid use of the MMU, and keep a "meta-data" that gives a thread owner for each address, and every access would do a software check of ownership. This would impose overheads for single-threaded accesses to memory, although accesses to unused memory and some accesses to multithreaded memory would be cheaper (because in such cases there would be no memory protection faults).

3. Peephole Recording

When an Independent Software Vendor (ISV) provides code to a User, it is quite common for the user to discover bugs or other issues in the code that the ISV was unaware of, and is unable easily to reproduce. This makes diagnosing and fixing such issues very difficult.

It the ISV is given a way to save to a file the starting state and the execution log of the program being debugged, then it is possible for the ISV to use this execution log file in order to investigate any issues without needing natively to reproduce them.

However, for many Users, it is unacceptable to send back the program's starting state and all inputs to the Software Vendor, e.g. because the inputs to the program contain sensitive data that it is unacceptable for the Software Vendor to be able to reproduce. In many cases however, it would be acceptable for the Software Vendor to be able to play back a small portion of the program, around the time of the failure, providing that the inputs to the program cannot be reconstructed. To facilitate such use cases, we propose a method of:

(a) recording the program being debugged using the techniques described elsewhere in this patent, and then (b) replay from a time close to the point of failure (e.g. 1 ms; the exact time would be configurable by the user), but change the memory protection of the replay process such that all memory is marked inaccessible. As the program being debugged runs in replay mode, whenever it touches memory a protection fault will occur. This fault shall be intercepted by the debugger, and the contents of the page in which the fault occurred shall be added to the execution log.

Thus the User can send back to the ISV an incomplete image of the program being debugged, but in such a way that the ISV can perform full fidelity reversible debugging.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A non-transitory computer readable medium having computer executable instructions for implementing a method of deterministic replay of a computer program, the method comprising:

periodically taking a snapshot of the computer program;

returning to a state in the history of execution of the program, the state comprising a set of values of:

registers of a processor on which the program is running, working memory space to which the program has access and operating system resources allocated to the program;

identifying in machine code representing the program, instances of machine code instructions for a first process that accesses the portion of shared memory;

identifying a second process that accesses the portion of shared memory;

storing an indication of ownership of the portion of memory by the first process in a first execution log associated with the first process;

modifying the program machine code such that the first processes has read and write permission to access the portion of shared memory and the second processes has neither read nor write permission to access the shared portion of memory;

identifying during concurrent execution of the first and second processes when the second process attempts to access the portion of shared memory; and executing an instruction sequence in response to identifying of said attempt to:

modify the program machine code in order that the second process has read and write permission to access the shared portion of memory;

store an indication of ownership of the portion of memory by the second process in a second execution log;

recording data and event to enable asynchronous modification of a shared portion of memory by the first process and second process and deterministically replaying the program using recorded log event at the appropriate time.

2. The non-transitory computer readable medium of claim 1 wherein said modifying of said program machine code comprises modifying said program machine code such that an attempted access by said second process results in a memory protection fault;

and wherein said identifying of said attempted access comprises identifying said memory protection fault.

3. The non-transitory computer readable medium of claim 2 wherein said executing of said instruction sequence comprises mapping said shared portion of memory to said second process.

4. The non-transitory computer readable medium of claim 3 further comprising storing values from said shared memory portion for later deterministic replay of said computer program.

5. The non-transitory computer readable medium of claim 4, further comprising:

modifying said program machine code to execute program instrumentation set of machine code instructions to handle substantially non-deterministic events;

executing said modified program machine code, storing a time series of said states during said executing;

restoring said stored state; and executing said modified program machine code forward in time starting at said restored state to return to said state in said program history of execution.

6. The non-transitory computer readable medium of claim 5 wherein said computer executable instructions comprise instructions for implementing a backwards debugger.

7. The non-transitory computer readable medium of claim 1 wherein said first and second processes comprise concurrent threads of said computer program.

* * * * *